US012683540B2

(12) United States Patent
Delgado-Nanez

(10) Patent No.: US 12,683,540 B2
(45) Date of Patent: Jul. 14, 2026

(54) SOLAR MODULE COUPLINGS FOR SOLAR TRACKER

(71) Applicant: Nextpower LLC, Fremont, CA (US)

(72) Inventor: Ricardo Delgado-Nanez, San Jose, CA (US)

(73) Assignee: NEXTPOWER LLC, Fremont, CA (US)

( * ) Notice: Subject to any disclaimer, the term of this patent is extended or adjusted under 35 U.S.C. 154(b) by 139 days.

(21) Appl. No.: 18/626,537

(22) Filed: Apr. 4, 2024

(65) Prior Publication Data

US 2024/0339960 A1 Oct. 10, 2024

Related U.S. Application Data

(60) Provisional application No. 63/457,294, filed on Apr. 5, 2023.

(51) Int. Cl.
H02S 20/32 (2014.01)

(52) U.S. Cl.
CPC .................................... H02S 20/32 (2014.12)

(58) Field of Classification Search
CPC ......... H02S 20/32; F24S 30/425; F24S 25/63; F24S 2025/6005; Y02E 10/47
See application file for complete search history.

(56) References Cited

U.S. PATENT DOCUMENTS

| | | | |
|---|---|---|---|
| 10,587,216 B2 | 3/2020 | Almy et al. | |
| 2011/0265860 A1 | 11/2011 | Ciasulli et al. | |
| 2016/0028345 A1 | 1/2016 | Wares et al. | |
| 2016/0105141 A1 | 4/2016 | Durney et al. | |
| 2023/0133308 A1* | 5/2023 | Ballentine ............... | F24S 25/63 136/251 |
| 2024/0322747 A1* | 9/2024 | Delgado-Nanez .... | F24S 25/634 |

OTHER PUBLICATIONS

International Searching Authority, "International Search Report and Written Opinion" From Application No. PCT/US2024/022951, Mailed Jul. 4, 2024, pp. 16.

* cited by examiner

*Primary Examiner* — Seung C Sohn

(74) *Attorney, Agent, or Firm* — Fredrikson & Byron, P.A.

(57) ABSTRACT

A coupling for use with a solar tracker includes an elongate body defining opposed top and bottom surfaces, the bottom surface defining a pair of protuberances disposed in spaced relation along a length of the elongate body and defining a gap therebetween, each of the pair of protuberances including a tab disposed thereon adjacent the gap, wherein the gap is configured to receive a torque tube such that an inner surface of the gap and the tabs of each of the pair of protuberances abut a portion of the torque tube, wherein each tab of the pair of protuberances includes a bore defined therethrough that is configured to receive a fastener to couple the elongate body to a torque tube.

13 Claims, 5 Drawing Sheets

SOLAR MODULE COUPLINGS FOR SOLAR TRACKER

RELATED APPLICATIONS

This application claims the benefit of U.S. Provisional Patent Application No. 63/457,294, filed Apr. 5, 2023, the entire contents of which are incorporated herein by reference.

FIELD

The present disclosure relates to solar power generation systems, and more particularly, to couplings and coupling systems for securing solar modules to a support structure.

BACKGROUND

Solar cells and solar panels are most efficient in sunny conditions when oriented towards the sun at a certain angle. Many solar panel systems are designed in combination with solar trackers, which follow the sun's trajectory across the sky from east to west in order to maximize the electrical generation capabilities of the systems. The relatively low energy produced by a single solar cell requires the use of thousands of solar cells, arranged in an array, to generate energy in sufficient magnitude to be usable, for example as part of an energy grid. As a result, solar trackers have been developed that are quite large, spanning hundreds of feet in length and including hundreds to thousands of individual solar modules that are mechanically coupled to support structures.

Coupling the numerous solar modules to the support structure requires a significant number of clamps or other mechanisms, each requiring a significant number of fasteners, driving up the cost of manufacturing each mechanism. As can be appreciated, assembling each of these mechanisms and securely tightening each fastener requires an enormous amount of time, contributing to increased cost and longer assembly time. The present disclosure seeks to address the shortcomings of prior tracker systems.

SUMMARY

In accordance with an aspect of the present disclosure, a coupling for use with a solar tracker includes an elongate body defining opposed top and bottom surfaces, the bottom surface defining a pair of protuberances disposed in spaced relation along a length of the elongate body and defining a gap therebetween, each of the pair of protuberances including a tab disposed thereon adjacent the gap, wherein the gap is configured to receive a torque tube such that an inner surface of the gap and the tabs of each of the pair of protuberances abut a portion of the torque tube, wherein each tab of the pair of protuberances includes a bore defined therethrough that is configured to receive a fastener to couple the elongate body to a torque tube.

In aspects, a through-hole may be defined through the upper surface of the elongate body and extending through the inner surface of the gap, the through-hole configured to receive a fastener to couple the elongate body to the torque tube.

In certain aspects, a plurality of through-holes may be defined through the upper surface of the elongate body and extending through the inner surface of the gap, each of the plurality of through-holes configured to receive a fastener to couple the elongate body to the torque tube.

In other aspects, the fastener may be a rivet.

In aspects, the gap may define a circular profile.

In certain aspects, the gap may define a square profile.

In other aspects, the upper surface of the elongate body may define a cavity, the cavity conforming to a profile of the lower surface, the pair of protuberances, and the inner surface of the gap.

In certain aspects, the elongate body may define a first planar portion adjacent a first end portion and a second planar portion adjacent a second, opposite end portion.

In aspects, the elongate body may define a recessed portion interposed between the first planar portion and the second planar portion.

In accordance with another aspect of the present disclosure, a kit includes a plurality of fasteners and a coupling for use with a solar tracker, the coupling including an elongate body defining opposed top and bottom surfaces, the bottom surface defining a pair of protuberances disposed in spaced relation along a length of the elongate body and defining a gap therebetween, each of the pair of protuberances including a tab disposed thereon adjacent the gap, wherein the gap is configured to receive a torque tube such that an inner surface of the gap and the tabs of each of the pair of protuberances abut a portion of the torque tube, wherein each tab of the pair of protuberances includes a bore defined therethrough that is configured to receive a fastener of the plurality of fasteners to couple the elongate body to a torque tube.

In aspects, each of the plurality of fasteners may be a rivet.

In other aspects, each of the plurality of fasteners may be a self-tapping screw.

In aspects, the plurality of fasteners may include a plurality of rivets and a plurality of self-tapping screws.

In certain aspects, the plurality of fasteners may include a plurality of rivets, a plurality of self-tapping screws, and a plurality of bolts.

In accordance with another aspect of the present disclosure, a method of securing a coupling to a torque tube of a solar tracker includes identifying, at an assembly site of the solar tracker, a location on a torque tube to place a coupling, determining if the torque tube includes a pre-formed bore that is configured to receive a fastener at the identified location, and coupling the torque tube to the coupling via the fastener.

In aspects, coupling the torque tube to the coupling may include coupling the torque tube to the coupling using a rivet.

In other aspects, the method may include advancing a fastener within a bore defined in the coupling.

In aspects, if it is determined that the torque tube does not include a pre-formed bore, the coupling may be coupled to the torque tube using self-tapping screws.

In certain aspects, if it is determined that the torque tube does not include a pre-formed bore, bores may be formed in the torque tube using the coupling as a template.

In other aspects, coupling the torque tube to the coupling may include advancing a rivet through a bore formed in the coupling and into the bore formed in the torque tube.

The details of one or more examples are set forth in the accompanying drawings and the description below. Other features, objects, and advantages will be apparent from the description and drawings, and from the claims.

BRIEF DESCRIPTION OF DRAWINGS

Various aspects and features of the present disclosure are described hereinbelow with reference to the drawings, wherein.

DETAILED DESCRIPTION

The present disclosure is directed to a coupling for supporting a solar module on a torque tube of a solar tracker. The coupling includes an elongate body having a generally saddle type configuration. A lower surface of the coupling defines a pair of protuberances in spaced apart relation, which defines a gap therebetween. When the coupling is placed upon a torque tube of the solar tracker, the torque tube is received within the gap. The coupling includes one or more through-bores defined through an upper surface and extending into the gap. The through-bores of the coupling are configured to receive a fastener, such as a rivet, a bolt, a screw, amongst others to couple the torque tube to the coupling. Each of the pair of protuberances of the coupling includes a corresponding tab defined thereon and disposed adjacent the gap. In this manner, when the coupling is placed upon the torque tube, each of the tabs abuts or otherwise contacts a surface of the torque tube. The tabs include a bore defined therethrough that is configured to receive a fastener, such as a rivet, bolt, screw, etc. to couple the torque tube to the coupling. The torque tube may include pre-formed bores (e.g., formed at the factory) or bores may be formed at the assembly location (e.g., in the field) of the solar tracker. In embodiments, the bores may be formed using a punch, a drill, etc. The bores may be formed free hand, using a pre-formed template, using the coupling as a template, or combinations thereof. In embodiments where the bores are not pre-formed in the torque tube, the coupling may be coupled to the torque tube using self-tapping screws or the like.

A method of coupling a torque tube to a coupling includes determining a location on the torque tube to affix a coupling. With the location determined, it is determined if the torque tube includes pre-formed bores at the desired location. If the torque tube includes pre-formed bores at the desired location, the bores formed in the coupling are aligned with the bores of the torque tube and the torque tube is coupled to the coupling using fasteners. If pre-formed holes are not present at the desired location, bores are formed in the torque tube at the desired location and the coupling is coupled to the torque tube using fasteners. In embodiments, the coupling may be coupled to the torque tube using self-tapping screws. These and other aspects of the present disclosure will be described in detail herein below with reference to the drawings.

Figure 1:
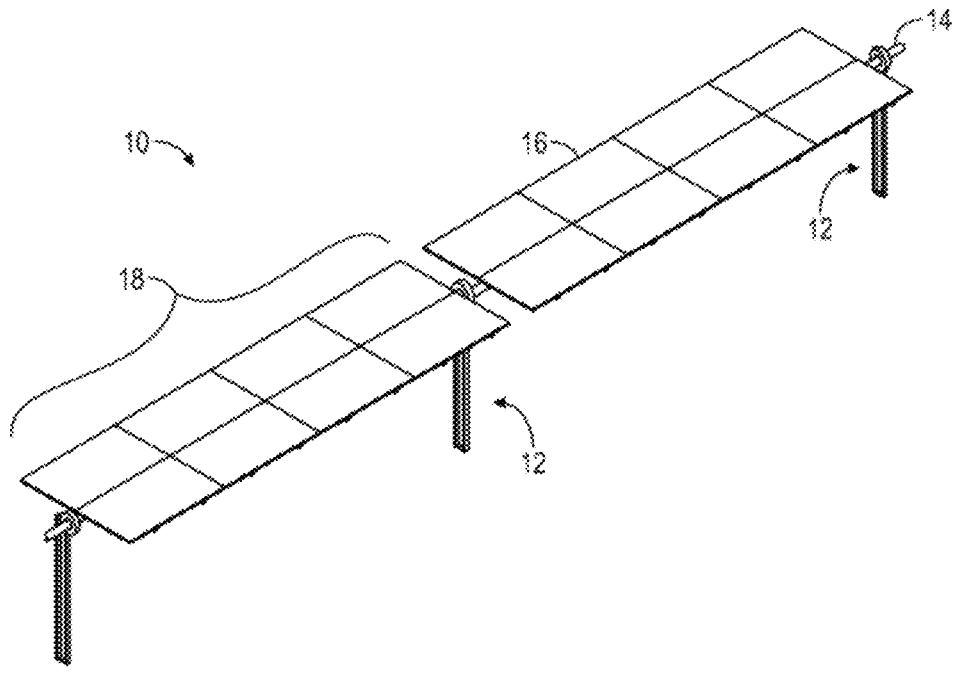
FIG. 1 is a top perspective view of a solar power system provided in accordance with the present disclosure.
Figure 2:
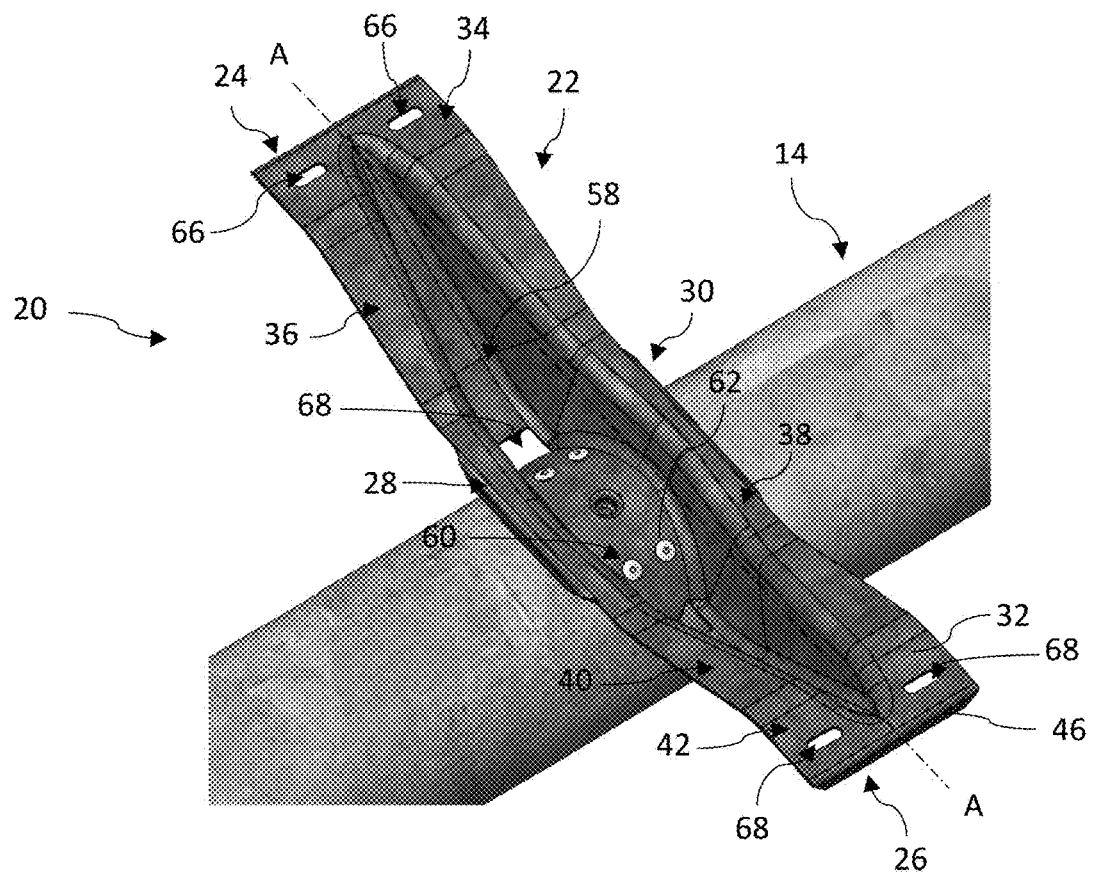
FIG. 2 is a top perspective view of a coupling provided in accordance with the present disclosure illustrated as being coupled to a torque tube.
Figure 3:
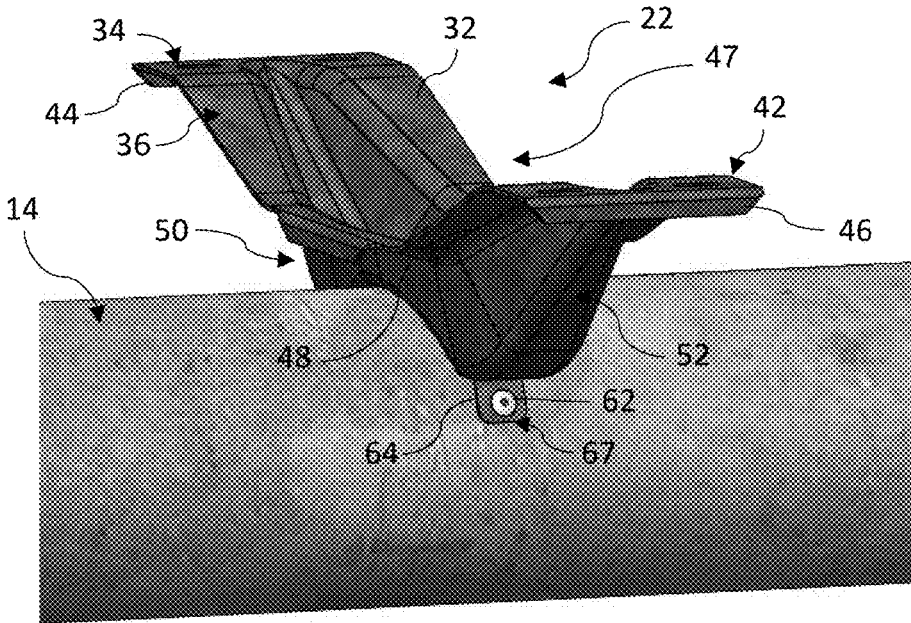
FIG. 3 is a side perspective view of the coupling of FIG. 1.
Figure 4:
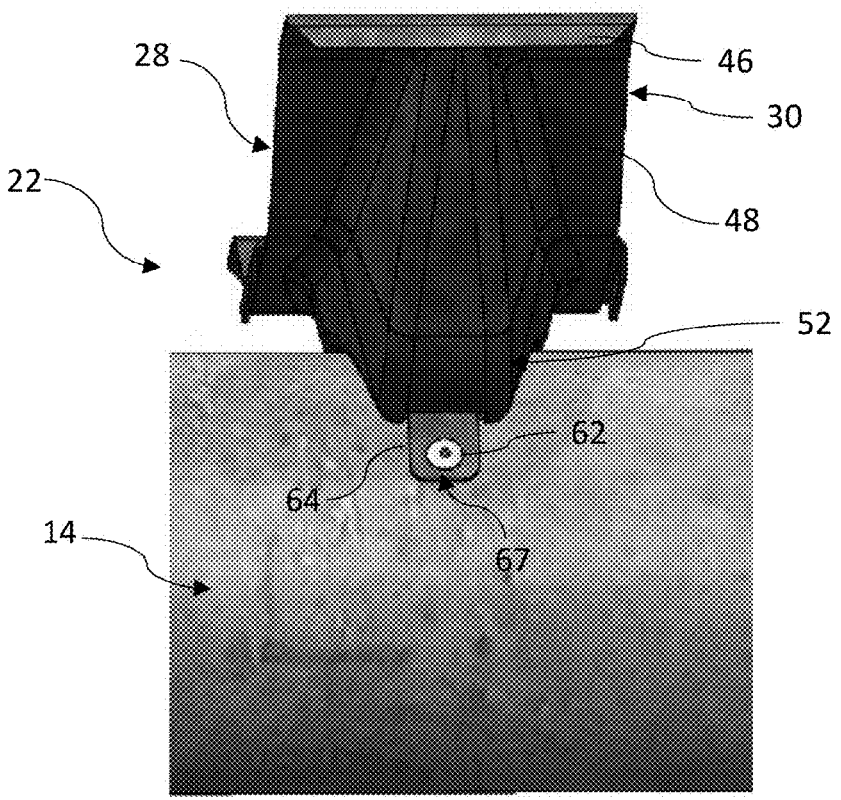
FIG. 4 is a side view of the coupling of FIG. 1.
Figure 5:
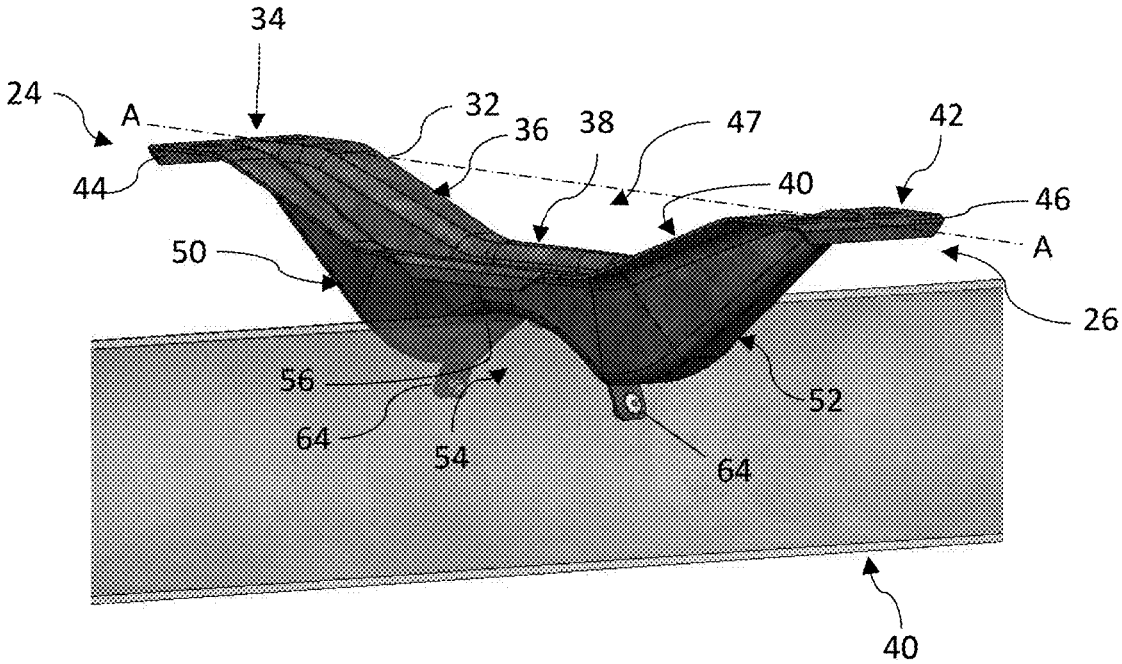
FIG. 5 is a side perspective view of the coupling of FIG. 1 including a cross-sectional view of the torque tube.
Figure 6:
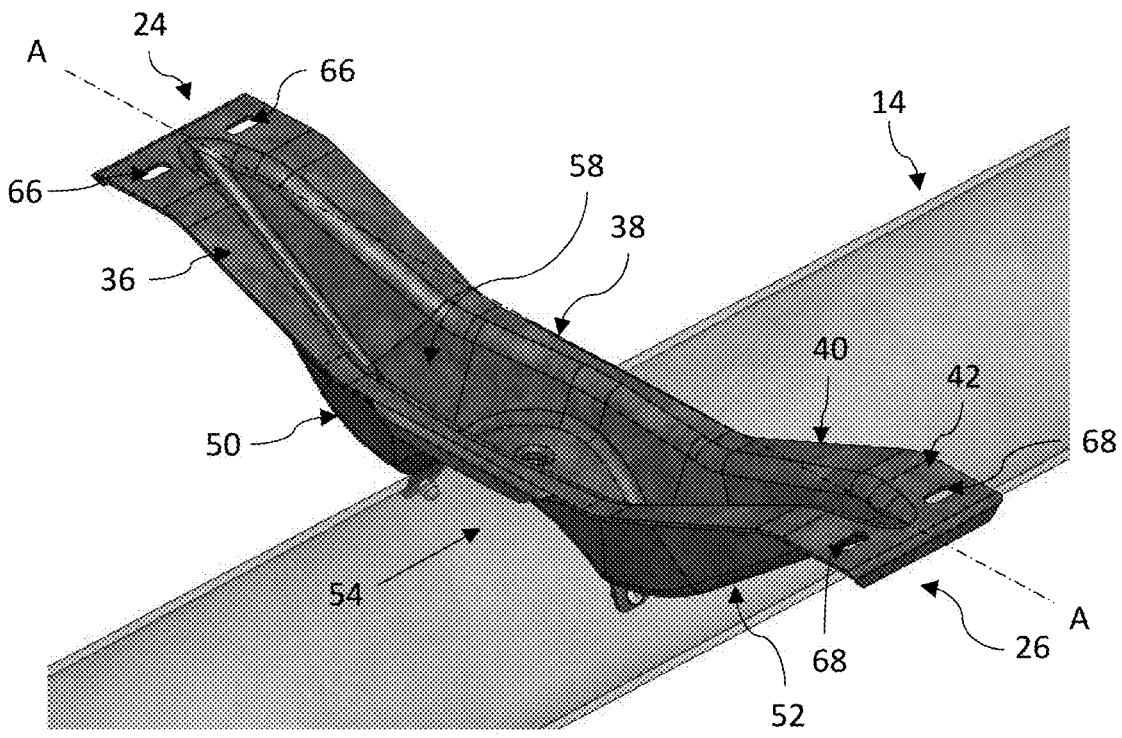
FIG. 6 is a perspective view of the coupling of FIG. 1 including a cross-sectional view of the torque tube.

Referring now to the drawings, FIG. 1 illustrates a solar power system or solar tracker provided in accordance with the present disclosure and generally identified by reference numeral 10. Piers 12 are spanned by a torque tube 14. A plurality of solar modules 16 are supported by and permitted to rotate with the torque tube 14. A distance between two piers 12, where the plurality of solar modules 16 are supported by the torque tube 14 define a bay 18. In FIG. 1, the solar modules 16 are arranged in a "two-in landscape" arrangement where the longer side of the solar module 16 is arranged parallel to the longitudinal axis of the torque tube 14. However, the solar modules 16 may be arranged in a "two-in portrait" arrangement where the shorter side of the solar module 16 is arranged parallel with the longitudinal axis of the torque tube 14 or even just "one-in portrait" without departing from the scope of the present disclosure. In embodiments, each solar tracker 10 will be formed of a plurality of bays 18, with each bay 18 being between 50 and 100 feet in length. The torque tube 14 is connected to a motor or dive device (not shown), which is mechanically connected to the torque tube 14 to rotate the torque tube 14 and therewith the solar modules 16 such that the solar modules 16 follow the path of the sun. While not illustrated in FIG. 1, a plurality of solar trackers 10 may be arranged in a parallel orientation with one another as part of a grid tied solar power plant outputting electrical energy for use by customers of the electrical grid.

As can be appreciated, the solar modules 16 must be supported on the torque tube 14. In embodiments, a bracket system (not shown) is coupled to the torque tube 14 that extends substantially perpendicular to the longitudinal axis of the torque tube 14. The torque tube 14 is rotatably about its longitudinal axis to adjust an angular orientation of the solar modules 16 relative to the sun, while supporting the solar modules 16 on the bracket system. It is envisioned that the bracket system can take many forms including two pieces of hat shaped steel, which are arranged to sandwich the solar modules 16, and are configured to connect a short rail or coupling which is bolted to the torque tube, as will be described in further detail hereinbelow.

With reference to FIGS. 2-6, a coupling for use with a solar module 16 is illustrated and generally identified by reference numeral 20. The coupling 20 includes an elongate body 22 extending between opposed first and second end portions 24 and 26 respectively, defining a longitudinal axis A-A. It is envisioned that the elongate body 22 may include any suitable length (e.g., dimension extending along the longitudinal axis A-A between the first and second end portions 24, 26) without departing from the scope of the present disclosure. The elongate body 22 includes opposed side surfaces 28 and 30 extending between ach of the first and second end portions 24, 26 and an upper surface 32 extending between each of the first and second end portions 24, 26 and the opposed side surfaces 28, 30. The upper surface 32 defines a first planar portion 34 adjacent the first end portion 24 and extending towards the second end portion 26. The first planar portion 34 transitions to a first sloped portion 36 in a direction towards the second end portion 26. The first sloped portion 36 forms an angle relative to the first planar portion 34 such that the first sloped portion 36 extends in a downward (e.g., a direction that is opposite to a direction in which the upper surface 32 is facing). The first sloped portion 36 transitions to a center planar portion 38 extending in a direction towards the second end portion 26 that is generally parallel with the first planar portion 34 but offset in a downward direction relative thereto, although it is contemplated that the center planar portion 38 may define any suitable angle relative to the first planar portion 34 or the first sloped portion 36 without departing from the scope of the present disclosure.

The center planar portion 38 transitions to a second sloped portion 40 extending in a direction towards the second end portion 26 along the longitudinal axis A-A. The second sloped portion 40 extends in an upward direction (e.g., away from the center planar portion 38 in the same direction in which the upper surface 32 is facing) and defines an angle relative to the center planar portion 38 that is generally the same as an angle formed between the first sloped portion 36 and the center planar portion 38, although it is contemplated that the second sloped portion 40 may define any suitable angle relative to the center planar portion 38 depending upon the design needs of the coupling 20. The second sloped portion 40 transitions to a second planar portion 42 that is generally parallel with and coplanar with the first planar portion 34, although it is envisioned that the second planar portion 42 may define any suitable angle relative to the first planar portion 34 and be disposed at any distance relative to the first planar portion 34 (e.g., higher or lower than the first planar portion 34). The second planar portion 42 extends towards and terminates at the second end portion 26. The elongate body 22 includes a pair of downturned flanges 44 and 46 disposed adjacent to each of the first and second end portions 24, 26, respectively. The pair of downturned flanges 44, 46 extend in a direction away from the upper surface 32 (e.g., towards the center planar portion 38). As can be appreciated, the first and second sloped portions 36, 40 and the center planar portion 38 define a recessed area 47 interposed between the first and second planar portions 34, 42.

The elongate body 22 defines a lower surface 48 disposed in juxtaposed relation to the upper surface 32 and extends between each of the first and second end portions 24, 26 and the opposed side surfaces 28, 30. The lower surface 48 defines a shape that generally conforms to the shape of the upper surface 32 except that the lower surface 48 includes a pair of protuberances 50 and 52 disposed thereon in spaced relation to one another such that a gap 54 is defined therebetween. The pair of protuberances 50, 52 extend in a downward direction (e.g., in the same direction in which the lower surface 48 is facing) and in cooperation with the gap 54, forms a generally inverted saddle or kidney bean configuration that is configured to selectively receive a portion of a torque tube 14 therein. In this manner, the gap 54 includes an inner surface 56 extending between the pair of protuberances 50, 52 that is configured to abut or otherwise contact a portion of the torque tube 14 received within the gap 54, as will be described in further detail hereinbelow. As can be appreciated, the gap 54 is configured to receive a torque tube 14 therein having any suitable profile, such as circular, hexagonal, D-shaped, oval, square, amongst others. The upper surface 32 includes a cavity 58 defined therein that generally conforms to the profile of the lower surface 48 and the pair of protuberances 50, 52. It is envisioned that the coupling 20 may be formed from any suitable material, such as steel, aluminum, a polymer, a composite, etc. and may be formed using any suitable process, such as machining, additive manufacturing, stamping, hydroforming, amongst others.

Figure 7:
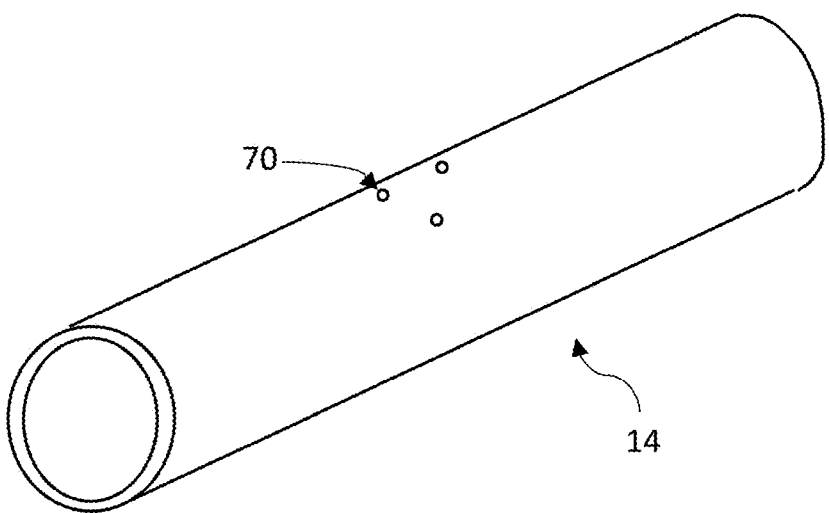
FIG. 7 is a perspective view of a torque tube of the solar power system of FIG. 1.

The inner surface 56 of the gap 54 includes one or more through-holes 60 defined therethrough and extending through the upper surface 32 of the cavity 58. Although generally illustrated as having first and second pairs of through-holes 60 disposed in spaced relation transverse to and along (e.g., a rectangular pattern) the longitudinal axis A-A, it is envisioned that any number of through-holes 60 may be defined through the inner surface 56 and the upper surface 32 that may be disposed in any pattern (e.g., circular, hexagonal, square, amongst others) without departing from the scope of the present disclosure. The through-holes 60 are configured to receive corresponding fasteners 62 (e.g., rivets, screws, bolts, welding, adhesives, amongst others) to couple the coupling 20 to the torque tube 14. In this manner, the fasteners 62 are configured to extend through the through-holes 60 and into corresponding holes or bores 70 (FIG. 7) defined through the torque tube 14.

The lower surface 48 of the elongate body 22 includes a pair of tabs 64 disposed on a respective protuberance of the pair of protuberances 50, 52 and extending in a downward direction (e.g., in the same direction the lower surface 48 is facing). The pair of tabs 64 is disposed on each of the pair of protuberances 50, 52 such that each of the pair of tabs 64 extends or otherwise lengthens the inner surface 56 of the gap 54 and follows the contour (e.g., curvature) of the inner surface 56 to contact or otherwise abut a portion of the torque tube 14 received within the gap 54. Each of the pair of tabs 64 includes a respective hole 67 defined therethrough that is configured to receive a respective fastener 62 therein to couple the coupling 20 to the torque tube 14. It is envisioned that the holes 67 of the pair of tabs 64 may receive any suitable type of fastener (e.g., rivets, screws, bolts, welding, adhesives, amongst others) and may be the same or different than the fasteners 62 received within the through-holes 60. In one non-limiting embodiment, the coupling 20 may be coupled to the torque tube 14 using self-tapping screws or other similar fasteners. It is contemplated that the pair of tabs 64 may be integral with (e.g., machined, punched, stamped, etc.) the elongate body 22 or may be separate components that are joined or otherwise coupled to the elongate body 22 using any suitable means, such as fasteners, welding, adhesives, amongst others. In one non-limiting embodiment, the pair of tabs 64 is formed by a punching procedure, forming a corresponding pair of bores 68 defined through the upper and inner surfaces 32, 56.

It is contemplated that the bores 70 defined in the torque tube 14 may be pre-formed (e.g., during fabrication or at the factory) before being received at the solar tracker site or may be formed on site during assembly of the solar tracker 10. It is envisioned that any number of sets of bores 70 may be defined in the torque tube 14, and may be defined at regular intervals, defined at specific locations, etc. without departing from the scope of the present disclosure. In embodiments where the bores 70 are formed in the field, it is contemplated that the bores 70 may be formed using any suitable means, such as drilling, punching, amongst others, and the coupling 20 may be used as a template to locate the position of each of the bores 70 formed through the torque tube 14 in the field. As can be appreciated, even in instances where the bores 70 are preformed, additional bores 70 may be formed on the torque tube 14 at any desired location during assembly of the solar tracker 10.

The first planar portion 34 of the elongate body 22 includes a first pair of bores or slots 66 defined therethrough and extending through the upper and lower surfaces 32, 48 adjacent the first end portion 24 and each of the opposed side surfaces 28, 30 (e.g., in spaced relation transverse to the longitudinal axis A-A). Each of the bores of the first pair of bores 66 includes a generally oval or racetrack profile extending transverse to the longitudinal axis A-A (e.g., extending lengthwise towards each of the opposed side surfaces 28, 30), although it is contemplated that the first pair of bores 66 may include any suitable profile, such as elliptical, circular, square, rectangular, amongst others, and may extend in any direction without departing from the scope of the present disclosure. In one non-limiting embodiment, one bore of the first pair of bores 66 may include a different profile than the other bore of the first pair of bores 66. The first pair of bores 66 is configured to selectively receive respective retaining bolts (not shown) or other suitable coupling means to selectively couple a solar module 16 to the coupling 20.

The second planar portion 42 of the elongate body 22 includes a second pair of bores or slots 68 defined therethrough and extending through the upper and lower surfaces 32, 48 adjacent the second end portion 26 and each of the opposed side surfaces 28, 30 (e.g., in spaced relation transverse to the longitudinal axis A-A). Each of the bores of the second pair of bores 68 includes a generally oval or racetrack profile extending transverse to the longitudinal axis A-A (e.g., extending lengthwise towards each of the opposed side surfaces 28, 30, although it is contemplated that the second pair of bores 68 may include any suitable profile and may be the same or different than the first pair of bores 66. The second pair of bores 68 is configured to selectively receive respective retaining bolts (not shown) or other suitable coupling means to, in cooperation with or exclusive of the first pair of bores 66, selectively couple a solar module 16 to the coupling 20.

In accordance with an aspect of the present disclosure, a kit may be provided including the coupling 20, one or more fasteners 62 to couple the coupling 20 to a torque tube 14, one or more fasteners (not shown) to couple the coupling 20 to a solar module 16, or combinations thereof. As can be appreciated, the kit may include any number of couplings 20, fasteners 62, etc. without departing from the scope of the present disclosure.

Figure 8:
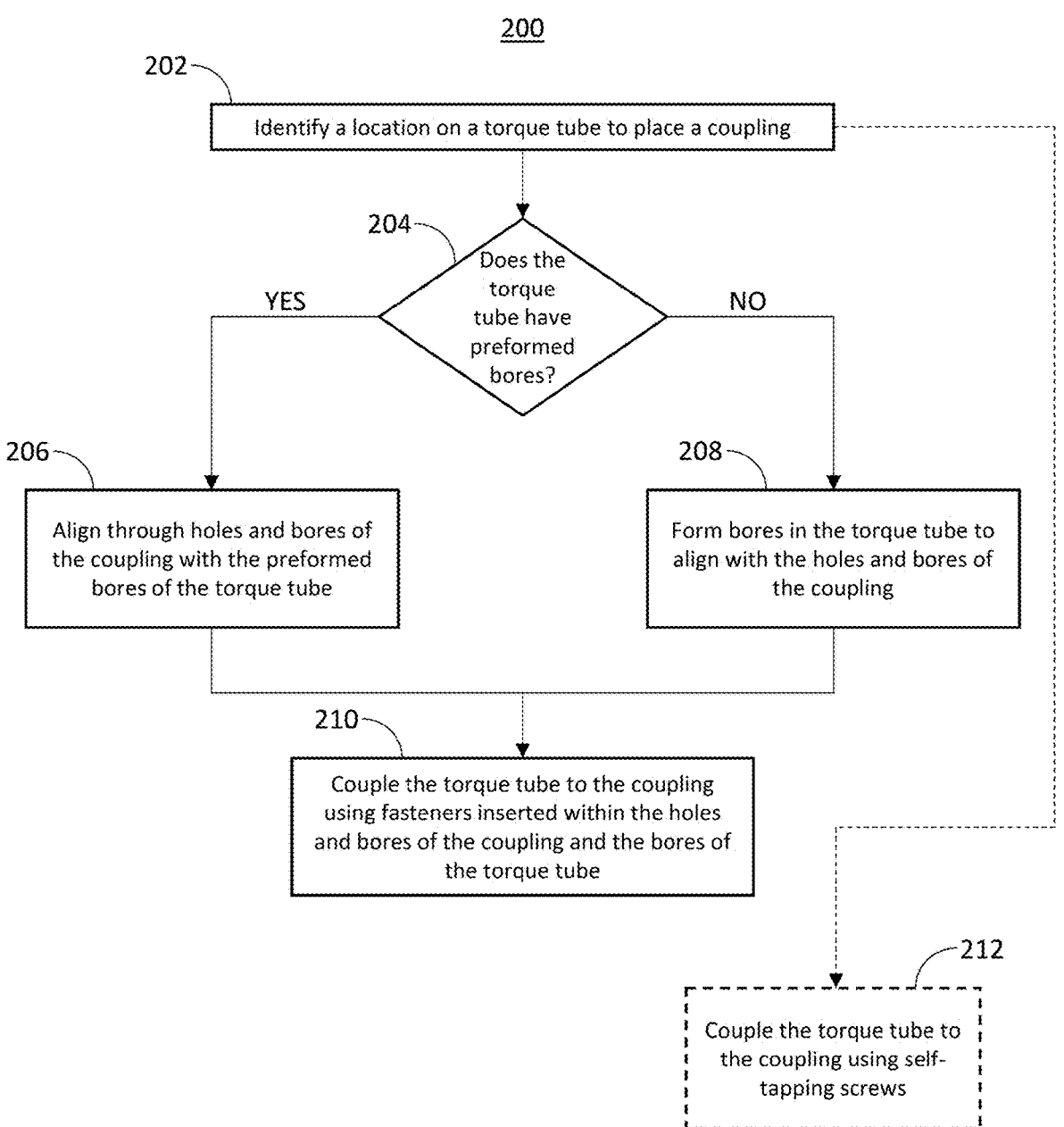
FIG. 8 is a flow chart detailing a method of installing a solar tracker employing the coupling of FIG. 2.

With reference to FIG. 8, a method of securing a coupling 20 to a torque tube 14 is described and generally identified by reference numeral 200. Initially, in step 202, a desired position of a coupling 20 on a torque tube 14 is determined. If the torque tube 14 includes preformed bores 70, in step 204 it is determined if the preformed bores 70 are disposed at a desired location. In step 206, if the preformed bores 70 are disposed at the desired location, the through-holes 60 and bores 66 of the coupling 20 are aligned with the preformed bores of the torque tube 14. If the preformed bores 70 are not disposed at the desired location, in step 208, bores 70 are formed through the torque tube 14 at the desired location that align with the through-holes 60 and bores 66 of the coupling 20. In step 210, with the through-holes 60 and bores 66 of the coupling 20 aligned with the bores 70 of the torque tube 14, the coupling 20 is coupled to the torque tube 14 using the fasteners 62. Alternatively, in step 212, the coupling 20 is placed in the desired location on the torque tube 14 and affixed to the torque tube 14 using self-tapping screws. As can be appreciated, the method 200 may be repeated as many times as necessary to facilitate assembly of the solar tracker.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

Various examples have been described. These and other examples are within the scope of the following claims.

The invention claimed is:

1. A coupling for use with a solar tracker, comprising: an elongate body defining opposed upper and lower surfaces, the lower surface defining a pair of protuberances disposed in spaced relation along a length of the elongate body and defining a gap therebetween, each of the pair of protuberances including a tab disposed thereon adjacent the gap, wherein the gap is configured to receive a torque tube such that an inner surface of the gap and the tabs of each of the pair of protuberances abut a portion of the torque tube, wherein each tab of the pair of protuberances includes a bore defined therethrough that is configured to receive a fastener to couple the elongate body to a torque tube, wherein a through-hole is defined through the upper surface of the elongate body and extends through the inner surface of the gap, the through-hole configured to receive a fastener to couple the elongate body to the torque tube.

2. The coupling according to claim 1, wherein a plurality of through-holes is defined through the upper surface of the elongate body and extending through the inner surface of the gap, each of the plurality of through-holes configured to receive a fastener to couple the elongate body to the torque tube.

3. The coupling according to claim 1, wherein the fastener is a rivet.

4. The coupling according to claim 1, wherein the gap defines a circular profile.

5. The coupling according to claim 1, wherein the gap defines a square profile.

6. The coupling according to claim 1, wherein the upper surface of the elongate body defines a cavity, the cavity conforming to a profile of the lower surface, the pair of protuberances, and the inner surface of the gap.

7. The coupling according to claim 1, wherein the elongate body defines a first planar portion adjacent a first end portion and a second planar portion adjacent a second, opposite end portion.

8. The coupling according to claim 7, wherein the elongate body defines a recessed portion interposed between the first planar portion and the second planar portion.

9. A kit, comprising:
a plurality of fasteners; and
a coupling for use with a solar tracker, the coupling including:
an elongate body defining opposed upper and lower surfaces, the lower surface defining a pair of protuberances disposed in spaced relation along a length of the elongate body and defining a gap therebetween, each of the pair of protuberances including a tab disposed thereon adjacent the gap, wherein the gap is configured to receive a torque tube such that an inner surface of the gap and the tabs of each of the pair of protuberances abut a portion of the torque tube, wherein each tab of the pair of protuberances includes a bore defined therethrough that is configured to receive a fastener of the plurality of fasteners to couple the elongate body to a torque tube, wherein a through-hole is defined through the upper surface of the elongate body and extends through the inner surface of the gap, the through-hole configured to receive a fastener to couple the elongate body to the torque tube.

10. The kit according to claim 9, wherein each of the plurality of fasteners is a rivet.

11. The kit according to claim 9, wherein each of the plurality of fasteners is a self-tapping screw.

12. The kit according to claim 9, wherein the plurality of fasteners includes a plurality of rivets and a plurality of self-tapping screws.

13. The kit according to claim 9, wherein the plurality of fasteners includes a plurality of rivets, a plurality of self- tapping screws, and a plurality of bolts.

\* \* \* \* \*